(12) United States Patent
Zhi et al.

(10) Patent No.: US 11,862,792 B2
(45) Date of Patent: Jan. 2, 2024

(54) MXENE-CLADDED ZINC PARTICLES AND AN ELECTRODE THEREOF

(71) Applicant: City University, Kowloon (HK)

(72) Inventors: Chunyi Zhi, Kowloon (HK); Xinliang Li, Kowloon (HK); Zhaodong Huang, Kowloon (HK); Qi Yang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 61 days.

(21) Appl. No.: 17/333,466

(22) Filed: May 28, 2021

(65) Prior Publication Data

US 2022/0384795 A1 Dec. 1, 2022

(51) Int. Cl.
| | | |
|---|---|---|
| H01M 4/42 | (2006.01) | |
| H01M 4/58 | (2010.01) | |
| H01M 4/02 | (2006.01) | |
| H01M 4/36 | (2006.01) | |

(52) U.S. Cl.
CPC ............... H01M 4/42 (2013.01); H01M 4/58 (2013.01); *H01M 4/366* (2013.01); *H01M 2004/021* (2013.01); *H01M 2004/027* (2013.01)

(58) Field of Classification Search
CPC .......... H01M 4/42; H01M 4/58; H01M 4/366; H01M 2004/021; H01M 2004/027
See application file for complete search history.

(56) References Cited

FOREIGN PATENT DOCUMENTS

| | | | | |
|---|---|---|---|---|
| CN | 108751995 A | * | 11/2018 | |
| CN | 111916709 A | * | 11/2020 | ........... C01B 32/182 |
| WO | WO-2020144289 A1 | * | 7/2020 | ............. H01G 11/26 |

* cited by examiner

*Primary Examiner* — Jane J Rhee
(74) *Attorney, Agent, or Firm* — Conley Rose, P.C.; Michael W. Piper; Andrew M. Metrailer

(57) ABSTRACT

This invention relates to a zinc powder electrode formed on a MXene framework. The zinc powder anode formed on an MXene framework, referred to as an MXene@Zn electrode can act as an anode and/or cathode for an electrochemical cell or battery. As such, the present invention further relates to an electrode comprising MXene@Zn and a battery comprising such an electrode.

9 Claims, 12 Drawing Sheets

MXENE-CLADDED ZINC PARTICLES AND AN ELECTRODE THEREOF

TECHNICAL FIELD

The present invention relates to the field of batteries. In particular, the present invention relates electrodes made of metal micro-particles, such as zinc powder.

BACKGROUND

Zinc is commonly used to provide the anode in batteries. This is because zinc is abundantly available at low cost, and batteries made of zinc electrode are relatively safe.

Some zinc anodes are in the form of a zinc foil. However, zinc foil deteriorates quickly due to dendrite growth, dead zinc and other parasitic reactions. To overcome this problem, it has been proposed to use zinc powder in place of zinc foil. The advantage is that zinc powder has increased surface area for interaction. However, this comes with many problems too.

For example, the three dimensional structure of zinc powder is amenable to zinc dissolution during the discharge stage. This creates a problem of cavities within the zinc electrode. Furthermore, the three dimensional structure provides many nucleation locations for $Zn^{2+}$ ions. This causes uneven deposition of the ions leading to growth of dendrites. Dendrites can penetrate the separator between the electrodes eventually, and cause internal short circuit and dead zinc.

Therefore, it is desirable to propose a solution which can exploit the benefits of zinc power as anode material but which mitigates the aforementioned problems.

STATEMENT OF INVENTION

In a first aspect, the invention proposes an electrode comprising particles of a transition metal encapsulated or cladded in a MXene.

MXene provides a chemically unreactive but conductive cladding, or encapsulation, around each of the particles. This prevents the metal particles from direct contact with each other. Nevertheless, MXene allows flow of electrons from surrounding electrolytes into the metal particle. Also, current may flow from particle to particle across MXene claddings.

Typically, the MXene has a charge that is opposite and attractive to the charge of the metal. This provides a natural physical and electrical affinity between the MXene and the metal particle, so that cladding the metal particle with the MXene can be as easy as just mixing the MXene and the metal particle in a suspension, and letting the MXene and the metal particle match up physically and naturally.

Depending on the element of the micro-particles, the MXene may be $Ti_3C_2T_X$, $Ti_3CNT_X$, $Ti_2CT_X$, $Ti_2NT_X$, $Nb_2CT_X$, $V_2CT_X$, or $Zr_4C_3T_X$. As the skilled man knows, although MXene is normally used to refer to $Ti_3C_2T_X$, MXene is actually a generic term covering all forms of two-dimensional inorganic compounds.

Where the metal is zinc, the preferred MXene is $Ti_3C_2T_X$, where $T_X$ is preferably selected from the group consisting of: —OH, =O, —F, —Cl, —Br, —I, —Se, —Te, —S and combinations thereof.

The pairing of zinc powder with a $Ti_3C_2T_X$ provides the possibility of an electrode with excellent efficiency and reversibility. $Zn^{2+}$ ions may be induced to undergo rapid but uniform nucleation along the surface of the electrode. Thus, sustained and reversible stripping/plating of zinc ions despite multiple charging and discharging cycles is now possible. Therefore, a MXene@Zn electrode may have a long service life (200 hr) while maintaining an excellent overpotential within 30 mV.

Possibly, the zinc micro-particles have a diameter of between 100 nm to 200 µm. However, in a preferred embodiment, the zinc micro-particles have a diameter of around 5 µm.

Accordingly, the invention provides possibility of using conductive MXene flakes as electron and ion redistributors to solve intrinsic issues of zinc power used as electrode material, mitigating the problem of the formation of nucleation sites, resulting in a stable and highly reversible zinc powder electrode. The composite of zinc powder and MXene materials is denoted as MXene@Zn in the present application.

In a second aspect, the invention proposes a rechargeable battery comprising an electrode comprising the material described above.

A further advantage of MXene@Zn electrode is it is highly compatible in both organic and aqueous electrolyte environments, and is also highly compatible with the various cathodes commonly used in zinc ion batteries including MnO2, V2O5, cyanogroup iron hexacyanoferrate (FeHCP).

Thus, in a third aspect, the invention proposes a rechargeable cell: FeHCF//MXene@Zn. Paired with a cyanogroup iron hexacyanoferrate (FeHCF) cathode, the FeHCF//MXene@Zn full battery delivers superior cycle durability and rate capability, whose service life with a CE of near 100% touches 850% of bare zinc powder counterparts.

In a further aspect, the invention proposes a conductive material, wherein the conductive material comprising transition metal micro-particles cladded in MXene. It is envisaged that besides in an electrode, there are other uses of the zinc and MXene composite.

BRIEF DESCRIPTION OF THE DRAWINGS

It will be convenient to further describe the present invention with respect to the accompanying drawings that illustrate possible arrangements of the invention, in which like integers refer to like parts. Other embodiments of the invention are possible, and consequently the particularity of the accompanying drawings is not to be understood as superseding the generality of the preceding description of the invention, in which.

DETAILED DESCRIPTION

Figure 1:
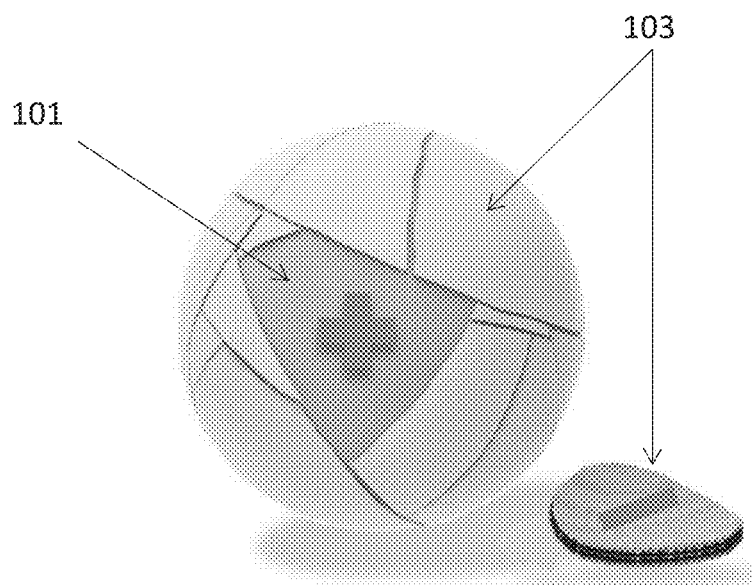
FIG. 1 illustrates an embodiment of the invention.

FIG. 1 shows an embodiment 105 of the invention, which is a metallic micro-particles 101 cladded with a layer of MXene 103, e.g. $Ti_3C_2T_x$. The metallic micro-particle 101 is preferably zinc but in other embodiments (not illustrated), the micro-particle can be made of another suitable transition metal.

MXenes 103 are a relatively new material, and are ceramics-metallic structures that belong to a class of two-dimensional inorganic compounds. MXenes 103 were developed and produced following discovery of single layer graphenes. Generally, most MXenes 103 are layers of carbides, nitrides or carbonitrides interleaved with layers of a transition material, which is most commonly titanium (the transition metal which is part of the MXene is not to be confused with the transition metal which the MXene clads).

Hence, MXenes 103 are typically just a few-atoms-thick. In a flake of MXene 103, there is usually n+1 layers of transition metals (M) are interleaved with n layers of carbon or nitrogen (X) with a general formula of $M_n+1X_nT_x$.

$T_x$ represents the surface termination, and may be O, OH, F and/or Cl which are bonded to the outer M layers of the MXene 103. In the present embodiment, the flakes of MXenes 103 used are preferably "Few-layered" Mxenes.

"Few-layered" is a terminology describing MXenes 103 of a thickness with less than 5 atomic layers. However, typical MXenes with thickness of 1 to 150 layers are within the contemplation of this application.

Also, the preferred MXene has a lateral size ranging from 20 nm to 100 µm.

Figure 2:
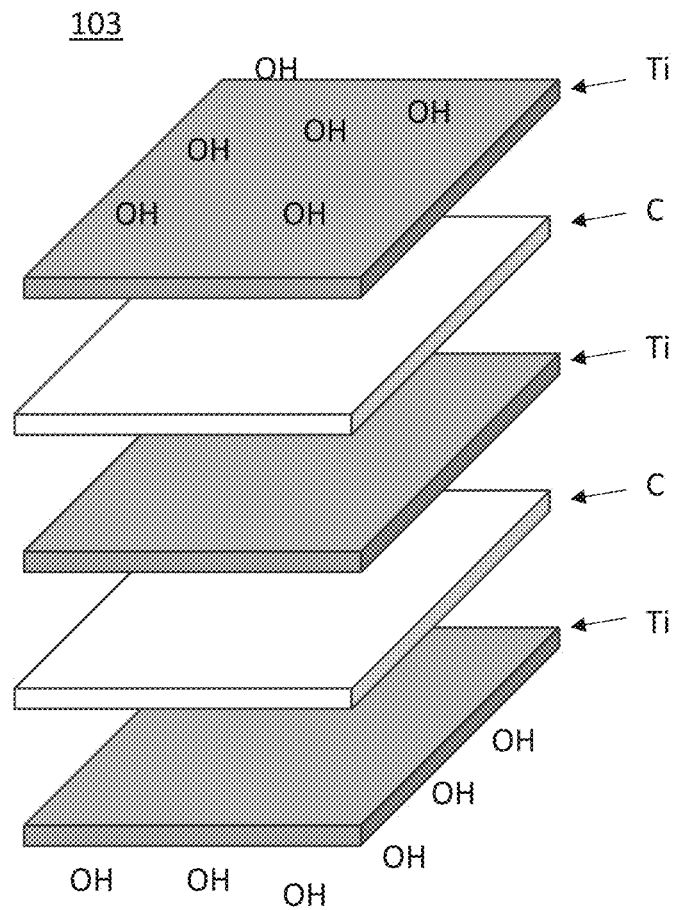
FIG. 2 illustrates schematically a part of the embodiment illustrated in FIG. 1.

By way of example, FIG. 2 illustrates a MXene having a structure of Ti—C—Ti—C—Ti, i.e. $Ti_3C_2$. The extreme layers of titanium is supplied with —OH functional groups. However, the transition metal M in the MXene does not have to be a single element; a mix of two metal elements is possible, e.g. $(Ti,Nb)CT_x$.

Advantageously, MXenes 103 combine metallic conductivity of transition metal carbides and a hydrophilic nature because of the hydroxyl or oxygen terminated surfaces, and have excellent electrical conductivity (15000 S $cm^{-1}$). Furthermore, MXenes typically has superior physical flexibility or morph-ability, with Young's modulus reaching about 0.33 TPa and breaking strength reaching around 17 GPa, and is able to adapt and lay over any surface profile intimately.

The synthesis of MXene 103 is known and does not require detailed description here. It suffices to mention that Few-layered $Ti_3C_2T_x$ MXene 103 may be synthesized by a wet-etching method using HCl/LiF etchant and $Ti_3AlC_2$ MAX precursor.

Figure 3A:
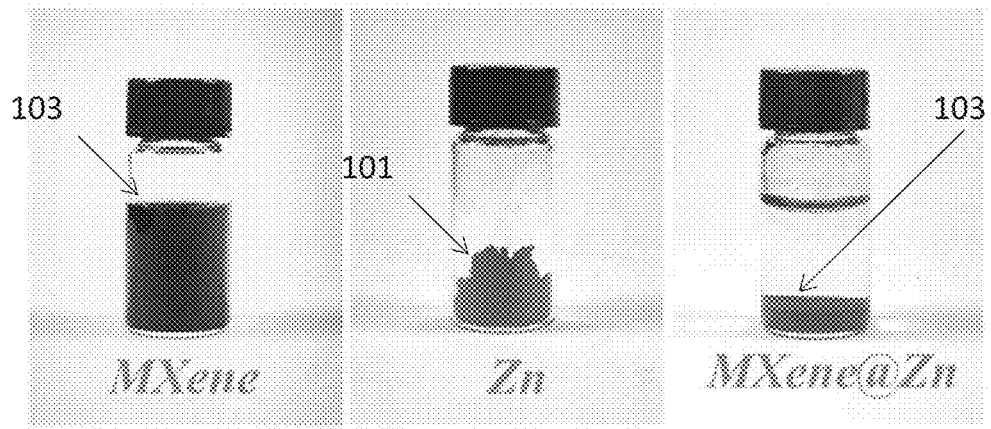
FIG. 3a shows photographs corresponding to the making of the embodiment of FIG. 1.

The method of assimilating MXene and zinc micro-particles is illustrated in FIG. 3. The leftmost photograph in FIG. 3a shows a water suspension of MXene 103. The middle photograph shows a vial of zinc micro-particles that has settled on the bottom of a vial. The rightmost photograph of FIG. 3a shows zinc micro-particles that are cladded with MXenes, annotated as MXene@zinc, which is a specific embodiment (therefore, MXene@zinc is also referenced by the same numeral '103'). Upon mixing the zinc micro-particles to the MXenes, the mixture is stirred for 1 hr and left standing for 0.2 hr. The intrinsic electro-negativity of $Ti_3C_2T_x$ matches the electro-positivity of zinc. Thus, the $Ti_3C_2T_x$ flakes are easily compelled to clad onto the zinc micro-particles. Hence, the MXenes slowly and automatically wraps around the individual zinc micro-particles, encouraged by the electro-attraction between the MXene and the zinc micro-particles, and aided by the flaccid nature of the MXene flakes.

Figure 3B:
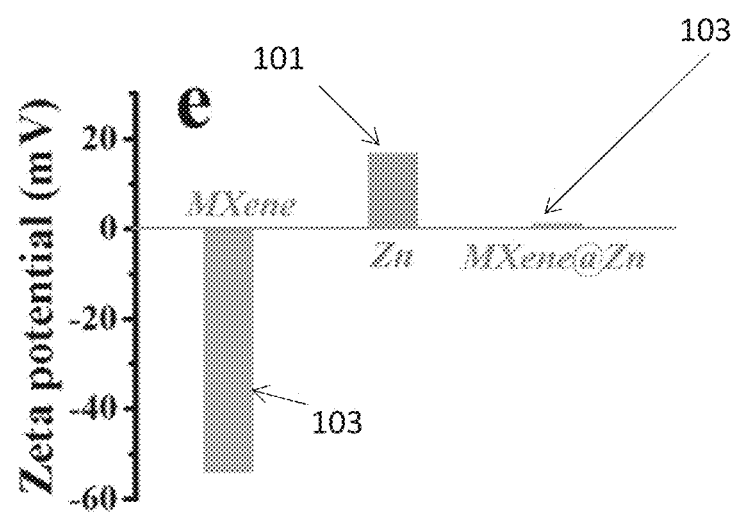
FIG. 3b shows the Zeta potential of the embodiment of FIG. 1 and its raw materials.

The Zeta potential of MXene flakes of −54 mV, which means MXene flakes form a highly stable colloid in water, which is good for mixing with the zinc micro-particles 101. The Zeta potential of MXene flakes is opposite to that of the positively charged zinc micro-particles at 17 mV. As shown in FIG. 3b, the Zeta potential of MXene@Zn composite is just about 1.5 mV. A low Zeta potential means that solids in the suspension are very likely to cluster together and therefore suitable for use as material in a solid electrode.

Hence, upon complete cladding of all the zinc micro-particles, the mixture separates into two distinct parts. The upper layer is just water, and the dense bottom sediment is the electrostatic, self-assembled MXene@Zn composite 103. This ability to self-assemble provides that MXene@Zn composite can be produced on an industrial scale.

Figure 4:
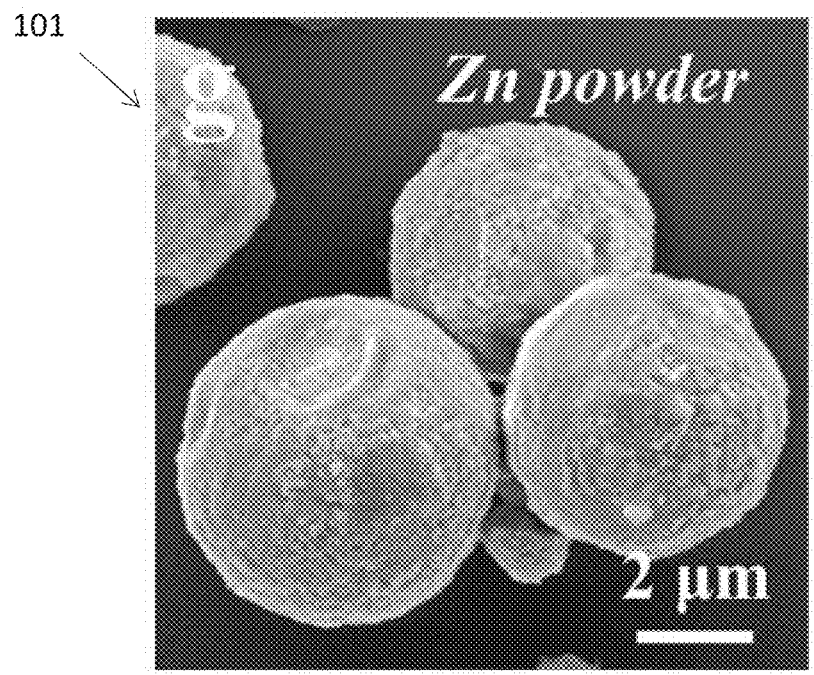
FIG. 4 is an electron microscope of part of the embodiment of FIG. 1.
Figure 5:
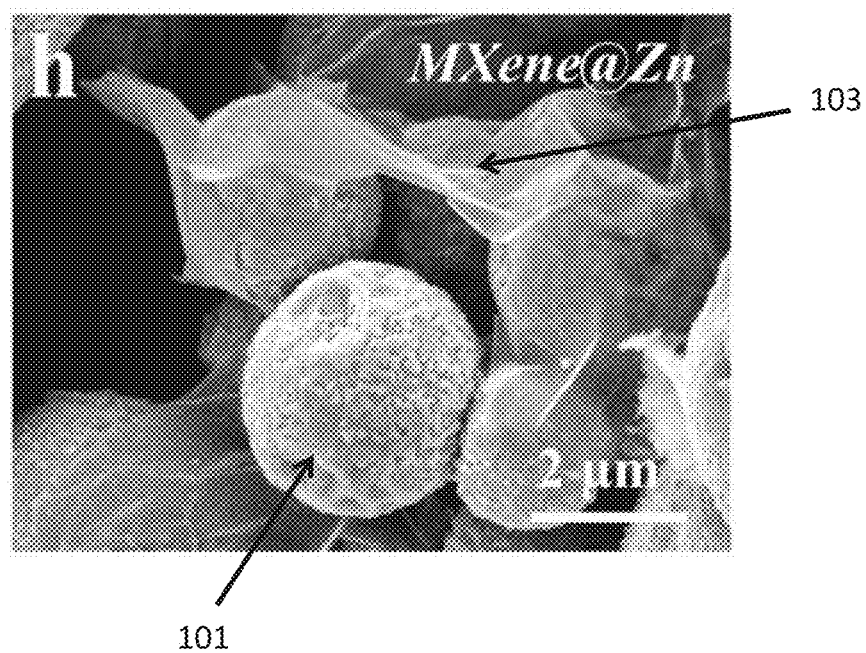
FIG. 5 is an electron microscope of the embodiment of FIG. 1.

The zinc micro-particles 101 used is preferably a monodisperse powder that has a diameter of around 5 µm, as shown in the scanning electron microscopic (SEM) image of FIG. 4. The SEM photograph shows that the particle surface is rough and full of protruding spots. However, any zinc powder having a particle size ranging from a tiny 100 nm to a large 200 µm is useable for mixing with MXene 103 to produce the MXene@Zn composite 105. FIG. 5 is an SEM image of the zinc micro-particles 101 of FIG. 4 wrapped around by $Ti_3C_2T_x$.

Figure 6:
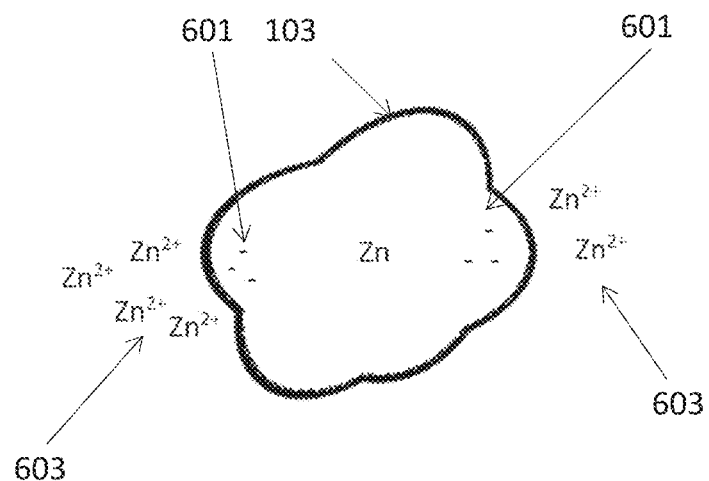
FIG. 6 shows how dendrite builds up in a prior art to the embodiment of FIG. 1.
Figure 7A:
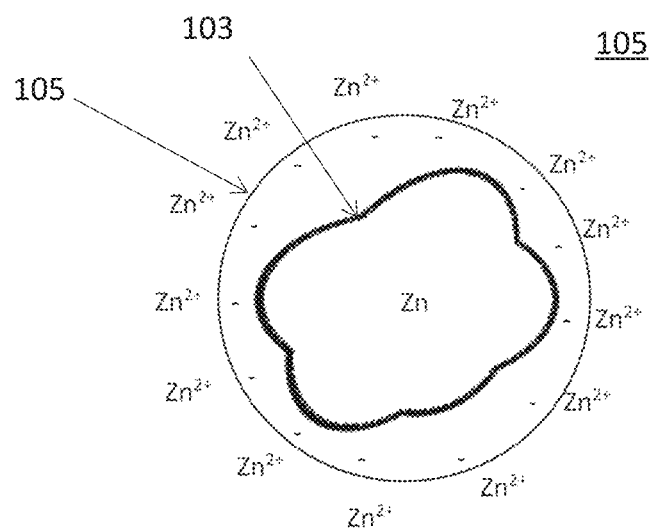
FIG. 7a shows how dendrite does not builds up in the embodiment of FIG. 1.

FIG. 6 schematically shows $Zn^{2+}$ ions gathering around nucleation sites 601 which can promote uneven deposits 603 from zinc ions on the surface of a zinc particle. In contrast, FIG. 7a shows schematically how MXene cladding over a zinc micro-particle redistributes the charge around the zinc micro-particle, and causes even deposits of $Zn^{2+}$ ions around the MXene-clad zinc micro-particle 105. This discourages nucleation sites and formation of dendrites. As MXenes are conductive, even on a grand scale such as a compact electrode made of these MXene cladded zinc micro-particles, the distribution of zinc ion deposit is likely to be even over the entire electrode.

Figure 7B:
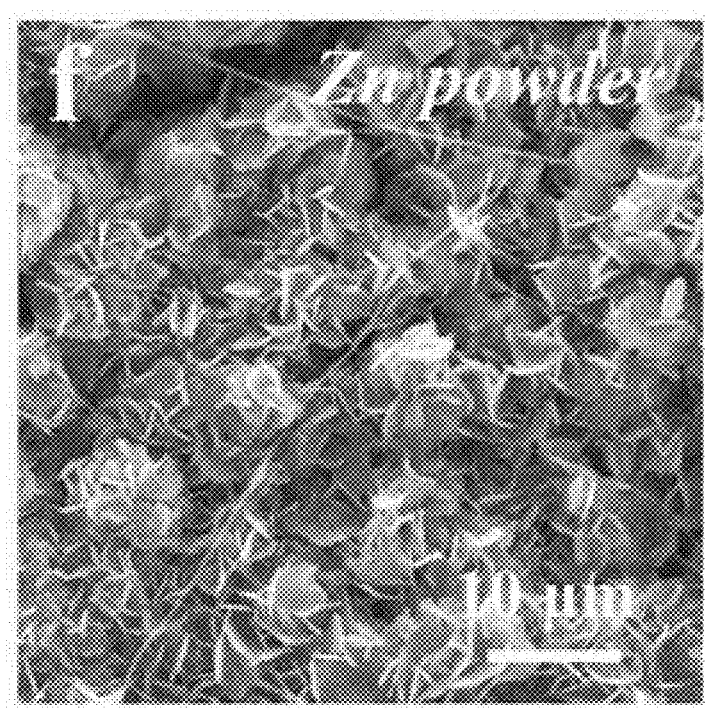
FIG. 7b is an SEM image of a zinc powder electrode of the prior art to embodiment 1.
Figure 7C:
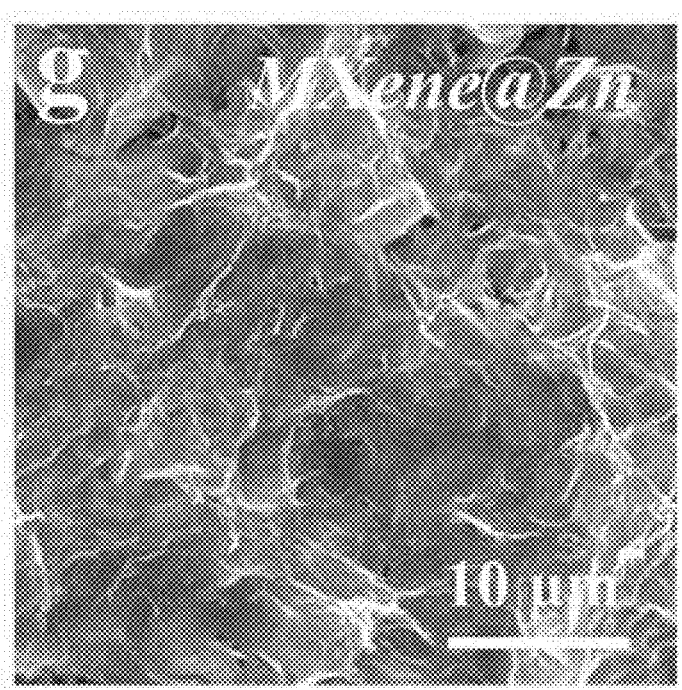
FIG. 7c is a SEM image showing that no visible dendritic-like protrusion area can be found even after zinc ions have been allowed to be deposited onto the embodiment of FIG. 1.

FIG. 7b is an SEM image of a zinc powder electrode of the prior art after having undergone several rounds of discharging and recharging. $Zn^{2+}$ ions does not deposit back to the original sites in the electrode from which they leaked. Instead, the $Zn^{2+}$ ions tend to grow as dendrites (see the star-like, sharp edged structures) in the subsequent charging process on the surface of the electrode. At this stage, electrical contact failure occurs inside the electrode and results in dramatic deterioration of overpotential value (voltage efficiency). However, in the case of MXene@Zn anode, the deposited surface remains flat and is accompanied with distinct wrinkles. FIG. 7c is a SEM image showing that no visible dendritic-like protrusion area can be found even after zinc ions have been allowed to be deposited onto the MXene@Zn anode.

As the skilled reader would appreciate, the redistributive function of the MXene cladding also reduces the chance of polarization.

Figure 8:
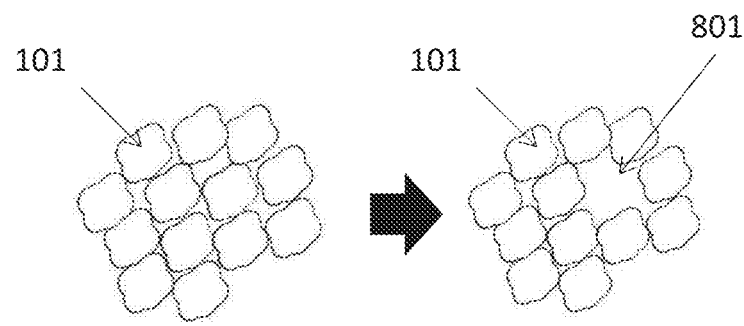
FIG. 8 shows electrode volume loss schematically in the prior art to the embodiment of FIG. 1.
Figure 9:
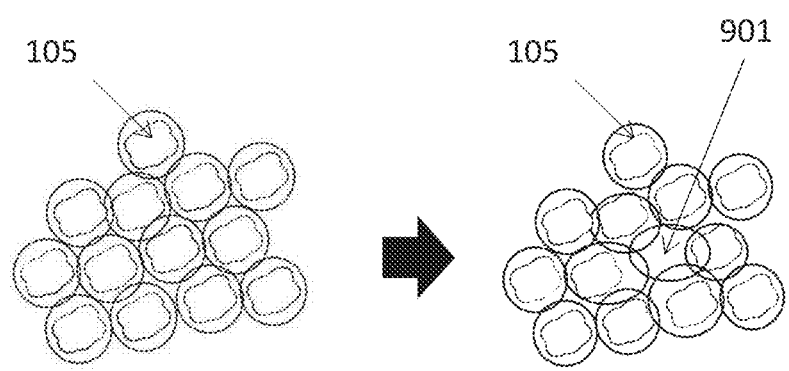
FIG. 9 shows how electrode volume loss is mitigated in the embodiment of FIG. 1.

FIG. 8 shows schematically how MXene claddings can mitigate the inevitable problem of electrode volume shrinkage. As an electrode discharges, the atoms in the electrode tend to dissolve and leak away from the electrode. This causes some of the zinc particles 101 to shrink or vanish, creating cavities 801 within in the electrode leading to broken contact points and affecting battery performance. FIG. 9 shows the same dissolution of zinc particles 101 in an electrode made of MXene cladded zinc micro-particles 105. In the event of volume shrinkage, the MXene 103 remains behind while the zinc dissolves away and, being flexible, may be able to fill in the space left behind by the dissolved zinc like an over-sized garment 901, maintaining contact with the neighbouring zinc micro-particles 101 and MXenes 103. This helps prolong use of the battery through more recharging cycles.

Figure 10:
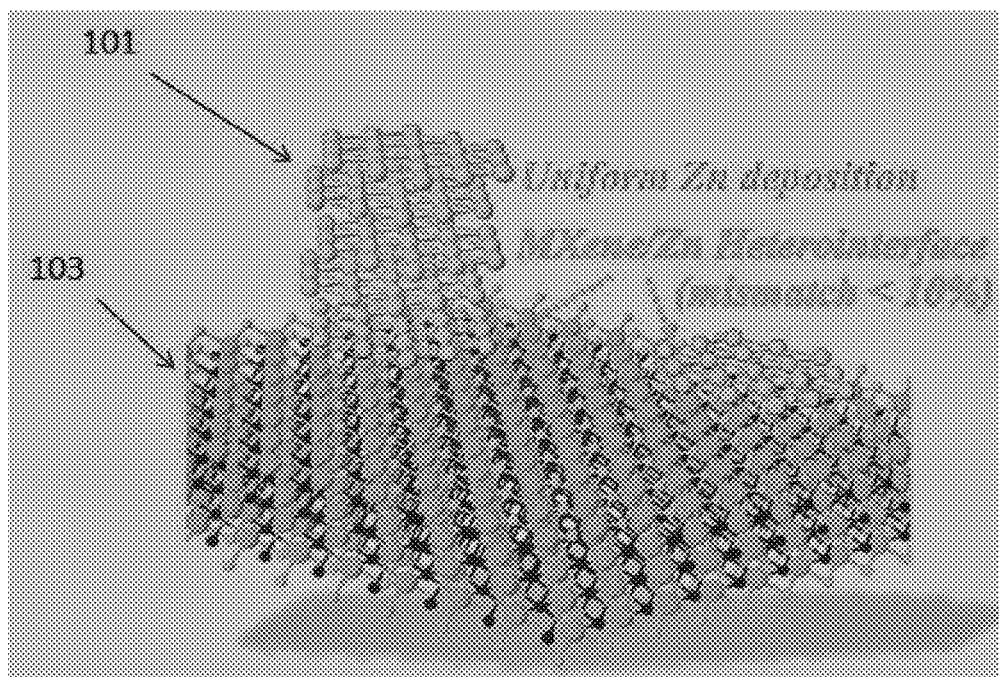
FIG. 10 illustrates the atomic lattice match in the embodiment of FIG. 1.

$Ti_3C_2T_x$ has an atomic lattice that has a hexagonal close packed (hcp) structure. Zinc ion deposits also have a hexagonal close packed (hcp) structure. This means that $Ti_3C_2T_x$ and zinc are physically compatible. This is illustrated in FIG. 10. Having compatible lattice structure means the ion deposit on the surface of the MXene cladding is likely to be even and smooth, which further discourages formation of dendrites. This low physical mismatch between the titanium-terminated surface of (0002) plane of $Ti_3C_2T_x$ and (0002) plane of zinc facilitates the formation of a coherent or semi-coherent interface, and allows reversible and uniform deposition of $Zn^{2+}$ ions.

Figure 11:
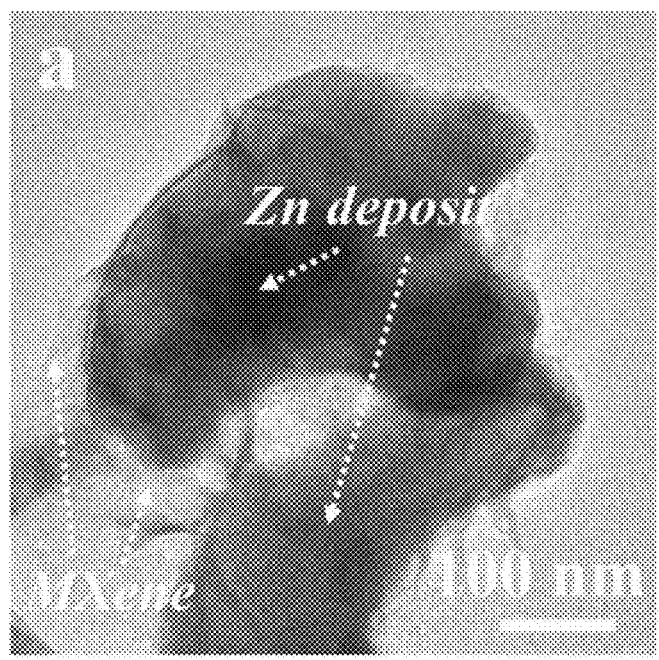
FIG. 11 is an SEM (scanning electron microscopy) image showing ionic deposits on an embodiment like that described in FIG. 1.
Figure 12:
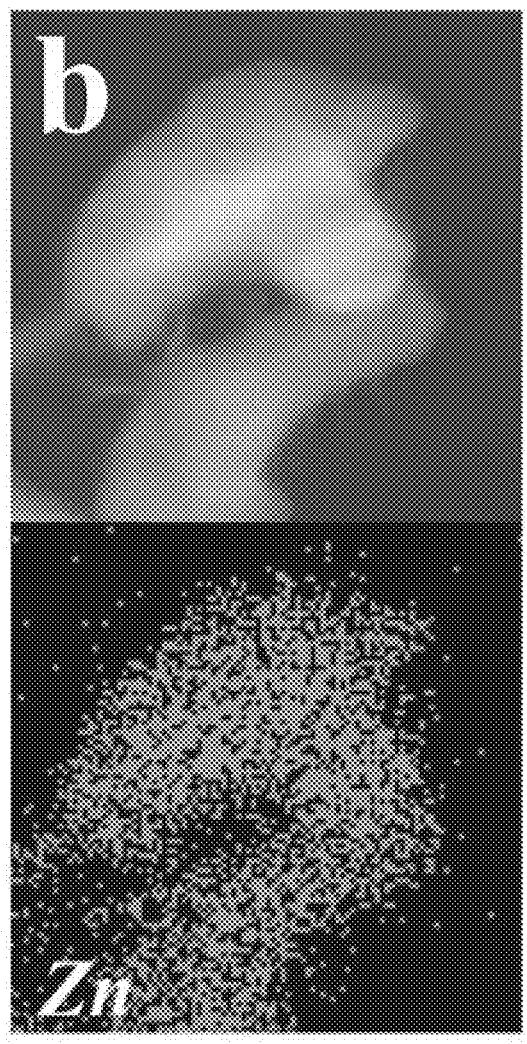
FIG. 12 is an TEM (Transmission electron microscopy) image showing ionic deposits on an embodiment like that described in FIG. 1.

As shown in FIG. 11, TEM (Transmission electron microscopy) image of MXene@Zn composite presents a sharp distinction between MXene substrate and Zn deposit. The inherent wrinkled and electron-transparent features are identified in MXene, and the upper Zn deposits hold the flat and neat surficial texture. No dendrite-like Zn deposit can be observed at this micron scale. The corresponding high-angle annular dark-field (HAADF)-scanning TEM and energy dispersive spectroscopy (STEM-EDS) in FIG. 12 indicate the homogeneous Zn deposition on MXene substrate without other impurities. See in particular the bottom picture in FIG. 12, the dots showing presence of zinc ion deposits on the MXene. The zinc ion deposits are spread evenly across the whole MXene surface without any clusters of nucleation or impurities.

Accordingly, to provide a novel material useable as a zinc electrode, zinc micro-particles 101 are cladded in MXenes 105 so that the zinc micro-particles 101 are separated from each other but remain in conductive contact with each other through the MXene 103.

Figure 13:
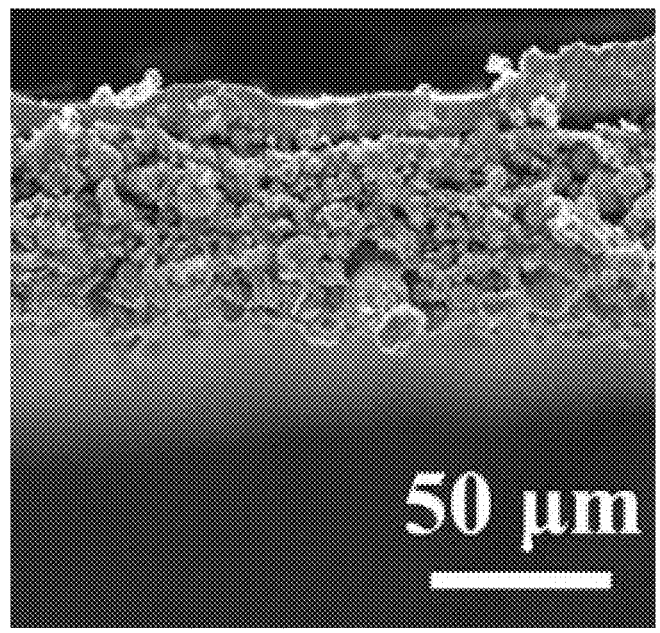
FIG. 13 is an electron microscope image of MXene wrapped zinc micro-particles such as that shown in FIG. 1, packed densely together.

Furthermore, the MXene 103 around the zinc micro-particles 101 provides pores or tiny spaces between the micro-particles. FIG. 13 displays a cross-sectional SEM image of the fabricated MXene@Zn anode. The densely stacked MXene@Zn composite spheres form a flat but rough surface, and the abundantly visible pores remaining inside are conducive to electrolyte filling. In other words, the zinc micro-particles 101 are sufficiently isolated from each other spatially for optimum contact with electrolytes. However, as MXenes 103 are conductive, electrical current can flow through both zinc micro-particles 101 and the MXene 103. This allows the MXene-wrapped zinc micro-particles 105 to be used as an electrode while spacing the zinc micro-particles apart to prevent the degeneration that is often seen in zinc powder electrodes.

Advantageously, as the surface of MXene flakes is hydrophilic, MXene cladded zinc micro-particles 105 provide an electrode material which has improved wettability which can enhance electrode performance.

MXene encapsulation of zinc micro-particles 101 not only breaks the irreversible imprisonment of zinc powder anode but also significantly improves the redox kinetics and cyclic durability of uniform Zn stripping/plating.

Figure 14:
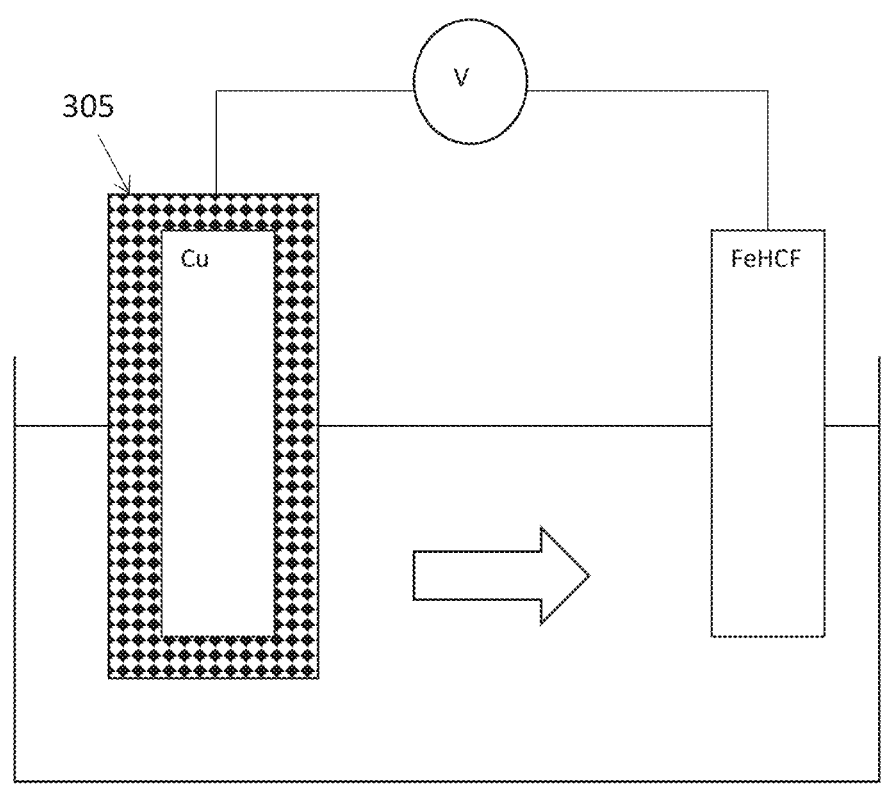
FIG. 14 illustrates a cell that employs the embodiment of FIG. 1.

FIG. 14 illustrates an electrode having MXene@Zn coated on a copper substrate, paired with a FeHCF cathode. In particular, a FeHCF//MXene@Zn cell has excellent electrochemical performance, the cycle life of which may be improved by nearly 850% against that of the conventional FeHCF//zinc powder battery (see experimental data below).

The described MXene@Zn is therefore a stable zinc powder electrode, having the advantages provided by MXene flakes which have high lattice compatibility with zinc, superior hydrophilicity and conductivity as the electrons and ions redistributor to achieve a battery with high charge and discharge recyclability.

Although $Ti_3C_2T_x$ cladded zinc micro-particles are mentioned in the above embodiments, other embodiments of different types of MXenes cladding micro-particles of other metals are within the contemplation of this application. For example, in different composites, MXene selected from: $Ti_3C_2T_x$, $Ti_3CNT_x$, $Ti_2CT_x$, $Ti_2NT_x$, $Nb_2CT_x$, $V_2CT_x$, and $Zr_4C_3T_x$, wherein $T_x$ represents functional group on the surface of the MXene 103, cladding other conductive elements such as copper, aluminium and so on are possible. The preferred pairs of metal and MXene have compatible lattice structure and opposite charge.

While there has been described in the foregoing description preferred embodiments of the present invention, it will be understood by those skilled in the technology concerned that many variations or modifications in details of design, construction or operation may be made without departing from the scope of the present invention as claimed.

The invention claimed is:

1. An electrode comprising:
   zinc particles,
   each zinc particle cladded in MXene,
   wherein the zinc particles are mutually separated by the MXene, and wherein the zinc particles have a diameter of 100 nm to 200 μm.

2. The electrode as claimed in claim 1, wherein each of the zinc particles has a diameter of around 5 μm.

3. The electrode as claimed in claim 1, wherein the MXene is $Ti_3C_2T_x$, $Ti_3CNT_x$, $Ti_2CT_x$, $Ti_2NT_x$, $Nb_2CT_x$, $V_2CT_x$, or $Zr_4C_3T_x$, and $T_x$ represents a functional group on the surface of the MXene.

4. The electrode as claimed in claim 3, wherein the MXene is $Ti_3C_2T_x$ and $T_x$ is selected from the group consisting of —OH, =O, —F, —Cl, —Br, —I, —Se, —Te, —S and combinations thereof.

5. A rechargeable cell of FeHCF//MXene@Zn, wherein the MXene@Zn is MXene-cladded zinc particles, and wherein the zinc particles have a diameter of between 100 nm to 200 μm.

6. A conductive material comprising zinc particles cladded in MXene, and wherein the zinc particles have a diameter of between 100 nm to 200 μm.

7. The conductive material as claimed in claim 6, wherein the MXene is $Ti_3C_2T_X$, $Ti_3CNT_X$, $Ti_2CT_X$, $Ti_2NT_X$, $Nb_2CT_X$, $V_2CT_X$, or $Zr_4C_3T_X$, and $T_X$ represents a functional group on the surface of the MXene.

8. The conductive material as claimed in claim 7, wherein the MXene is $Ti_3C_2T_X$ and $T_X$ is selected from the group consisting of —OH, =O, —F, —Cl, —Br, —I, —Se, —Te, —S and combinations thereof.

9. The conductive material as claimed in claim 6, wherein each of the zinc particles has a diameter of around 5 μm.

\* \* \* \* \*